(No Model.)
2 Sheets—Sheet 1.
G. H. SCHANCK.
CORN HARVESTER.
No. 512,124.
Patented Jan. 2, 1894.
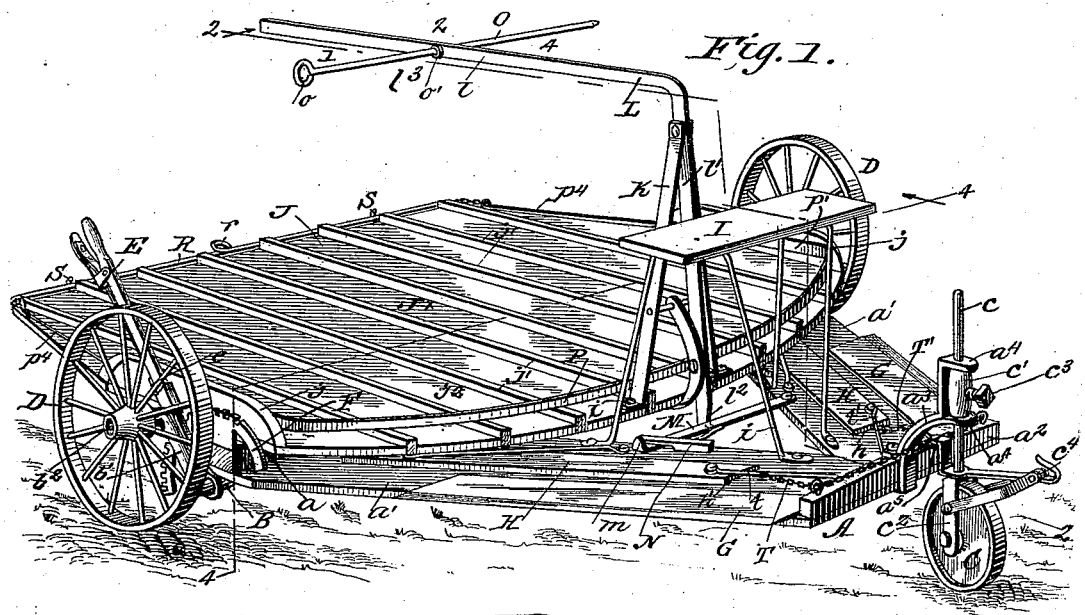
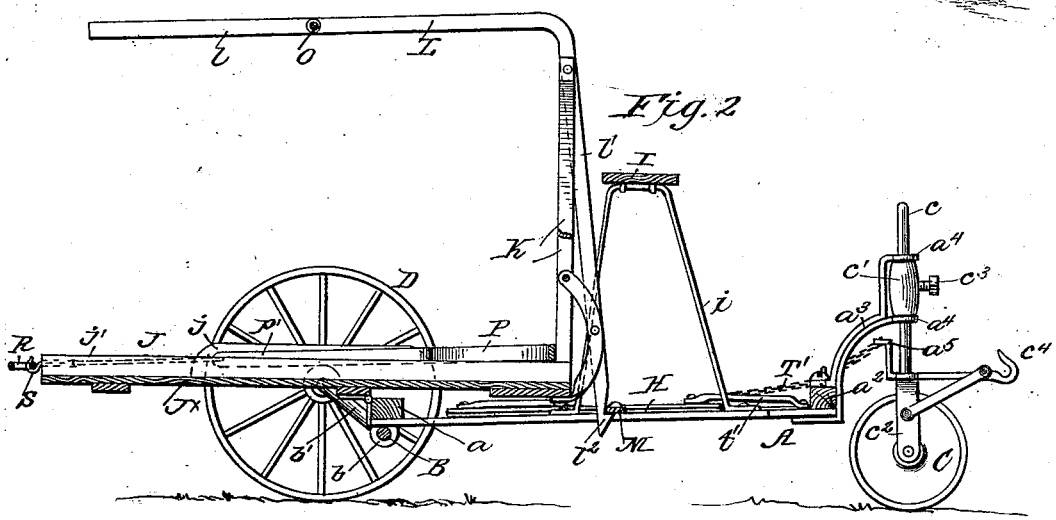
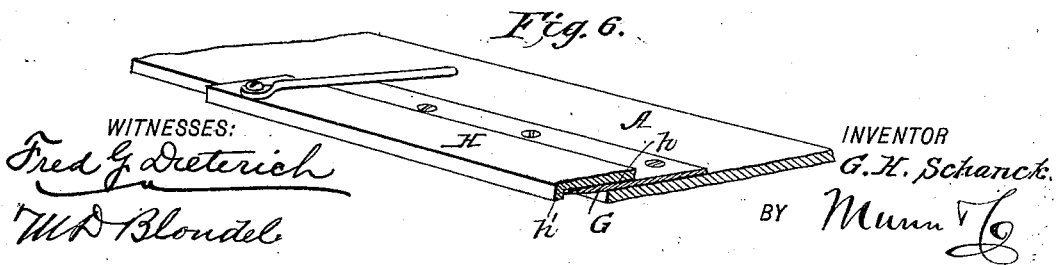
WITNESSES:
Fred G. Dieterich
M. D. Blondel
INVENTOR
G. H. Schanck
BY Munn & Co
ATTORNEYS.
THE NATIONAL LITHOGRAPHING COMPANY,
WASHINGTON, D. C.

(No Model.) 2 Sheets—Sheet 2.
G. H. SCHANCK.
CORN HARVESTER.
No. 512,124. Patented Jan. 2, 1894.
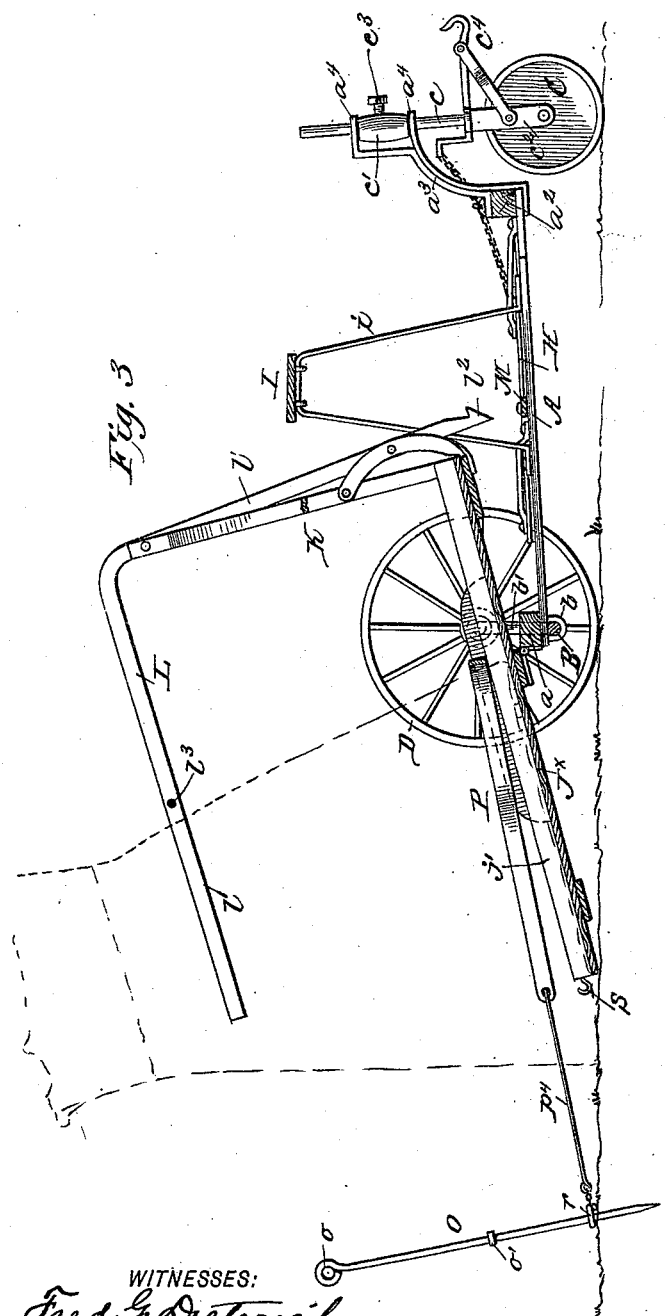
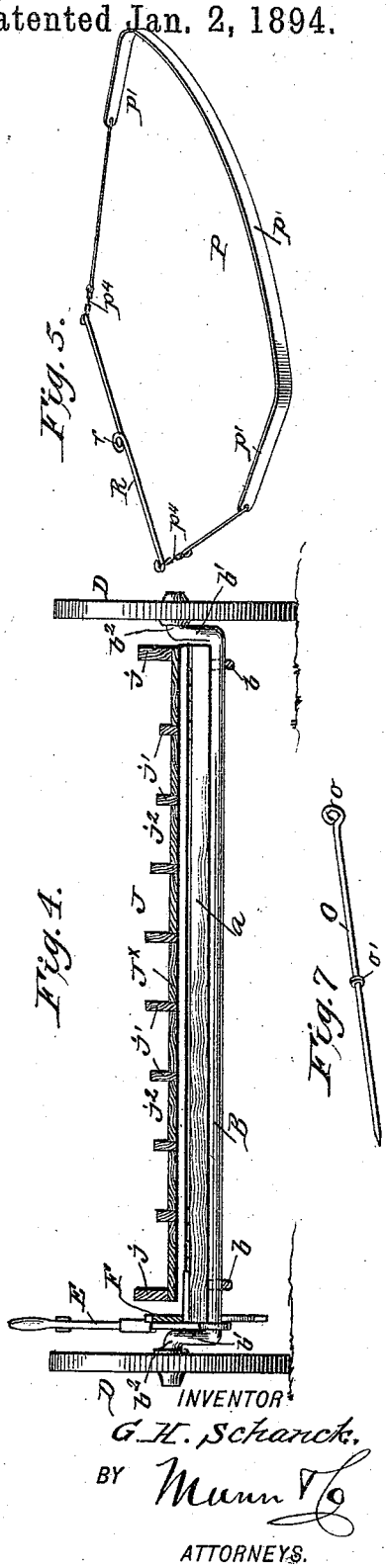
WITNESSES:
Fred G. Dieterich
M. D. Blondel
INVENTOR
G. H. Schanck.
BY Munn & Co
ATTORNEYS.

UNITED STATES PATENT OFFICE.

GEORGE H. SCHANCK, OF LIBERTYVILLE, ILLINOIS.

CORN-HARVESTER.

SPECIFICATION forming part of Letters Patent No. 512,124, dated January 2, 1894.

Application filed December 30, 1892. Serial No. 456,796. (No model.)

*To all whom it may concern:*

Be it known that I, GEORGE H. SCHANCK, residing at Libertyville, in the county of Lake and State of Illinois, have invented certain new and useful Improvements in Corn-Harvesters, of which the following is a specification.

My invention relates to that class of corn harvesters designed for cutting standing corn and delivering it onto a suitable platform until a desired amount has accumulated, when it is bound, formed into a shock and finally slid off onto the ground in a standing position.

My invention has for its object to provide a machine of this character simple and inexpensive in its construction, easily manipulated and which will serve to collect and discharge the corn in a shock held together in a compact and uniform manner.

It has also for its object to provide suitable means whereby the main frame and platform can be raised and lowered to cut the stalk at the point desired, and whereby such platform can be readily tilted to an inclined position to discharge the shock.

It has for its object furthermore to provide suitably arranged devices connected with the tilting platform, which will serve to steady the base and top of the shock as it is accumulated and formed on the platform and which will pull off the shock after it is tied from such platform onto the ground.

With other minor objects in view which will hereinafter be referred to, my invention consists in certain details of construction and peculiar combination of parts all of which will hereinafter be fully described, and specifically pointed out in the claims, reference being had to the accompanying drawings, in which—

Figure 1 is a perspective view of my improved harvester, the platform and frame being shown slightly elevated. Fig. 2 is a longitudinal section of the same taken on the line 2—2, Fig. 1. Fig. 3 is a similar sectional view the frame being lowered, the platform tilted and the shock partially pulled off from such platform. Fig. 4 is a transverse section on the line 4—4, Fig. 1. Fig. 5 is a view of the shock remover detached. Fig. 6 is a detail view of the cutter guard and Fig. 7 is a view of the anchor rod hereinafter referred to.

Referring to the accompanying drawings A indicates the main frame, which is approximately triangular in form, tapering toward its front end, whereby it will readily pass between two rows of stalks, and whereby the knives (presently referred to) will have a long cutting engagement with such stalks. This main frame comprises the rear cross bar $a$, which is mounted on the axle B, the converging side bars $a'$ $a'$ and the front cross beam $a^2$ which connects the side bars $a'$ as shown.

The front end of the machine is supported on a caster wheel C and is adapted for vertical adjustment thereon, it being connected to such wheel C in the manner most clearly shown in Fig. 2 of the drawings, by reference to which it will be seen that a bracket $a^3$ projects upward from the cross beam $a^2$, which has a pair of ears $a^4$ $a^4$ between which is held a sleeve $c'$ through which and the ears $a^4$ $a^4$ passes a vertical rod $c$ projected up from the caster wheel bearing yoke $c^2$, and such sleeve $c'$ has a set screw $c^3$.

$c^4$ indicates the draft or clevis member which projects forward from the yoke $c^2$ as shown.

By supporting the front end of the frame in the manner stated the caster wheel is held for sidewise movement, its rod $c$ turning in the ears $a^4$ of the bracket $a^3$, while such bracket can be held to any of its vertical adjustments on such rod, by the sleeve $c'$. The rear end of the frame A is also held for vertical adjustment, and for such purpose the axle B is held to rock in its bearings $b$ $b$ and formed with crank members $b'$ $b'$ having stub axles $b^2$ $b^2$ on which the drive wheels D D are journaled and at one side, one of such crank members $b'$ has an outwardly projecting lever E, formed with the usual spring actuated detent $e$ which is adapted to engage a rack segment F secured to the cross bar $a$ of the main frame as shown. By thus supporting the rear end of the frame A, such end can be raised or lowered by rocking the axle B to bring its crank $b$ to the angle desired.

The knives or cutters G which are in the nature of long blades, are secured on the side bars $a'$, their cutting edges projecting beyond the outer edge of such bars, and such blades extend from the front cross beam $a^2$ to a point adjacent the front end of the tilting platform presently referred to. By providing a pair of long blades mounted on the frame as shown it is manifest that a long sheer like cut will be effected.

To protect the cutting edges of the knives while the machine is being transported across the field, swinging sheaths or guard members H are provided which have undercut portions $h$ and flanges $h'$, which drop over the front or cutting edge of such knives when such guards are thrown out to the position shown in detail in Fig. 6; when such guards H are swung back they rest upon the side bars $a'$ as clearly shown in Fig. 1.

I indicates the seat or operator's support, which is arranged to accommodate two operators and is supported on the standards $i$ projected up from the side bars $a'$.

J indicates the swinging platform, which is hinged at a point forward of its center to the cross bar $a$, whereby its rear end will swing down to the position shown in Fig. 3 when the forward end is released. This platform which is preferably of the shape shown consists of a flat base $J^\times$ having side guards $j$ and a series of longitudinal ribs or partitions $j'$ which form channelways $j^2$, such side guards extending up to a point above the ribs $j'$ for a purpose presently explained. Centrally of the front end, the platform has vertical standards K in which is secured a "horse" or supporting arm L, which has a horizontal member $l$ which extends rearward the full length of the platform, and a downwardly extending arm $l'$, which has a latch portion $l^2$, which engages a spring actuated latch bar M secured to the frame A, and which has an unlocking finger $m$ at one end, which end is guided in a bail N, as shown most clearly in Fig. 1. About midway its length the member $l$ has an aperture $l^3$ in which is detachably held a combined supporting and anchor rod O, which rod is illustrated in detail in Fig. 7 and which has an eye $o$ at one end and a collar $o'$ near its center. This rod serves for two purposes, first as a transverse support for the upper ends of the stalks, when it is adjusted to the position shown in Fig. 1, and secondly, as an anchor rod when it is used as shown in Fig. 3. In operation when such rod is used as a supporting arm its end is passed through the aperture $l^3$ in the arm $l$ the collar $o'$ holding it from going more than half way through such aperture. When in this position it will be noticed such rod and the arm $l$ form four pocket like rests 1, 2, 3, and 4 to receive the upper ends of the stalks.

In practice one operator stands or sits at each side of the frame, who first fills the rear pockets 1, 2 and then the front pockets 3 and 4, after which the stalks are tied at a point above the supports $l$ and O.

It should be stated that by providing the base of the platform with a series of ways $j^2$ the lower ends of the stalks will be better supported and in a more uniform manner, as also facilitating the removal of such stalks when the platform is tilted; the lower ends of such stalks being also held spread apart by the ribs $j'$ as the stalk is pulled off from the platform.

As a simple and effective means for pulling the shock off the platform a detachable sling or bail like device P is used, which device is preferably formed of spring metal and comprises a bow portion $p$ and side arms $p'$ which arms when the device is in the position shown in Fig. 1, fit and are held by spring pressure between the side guards $j$ of the platform J. It will be noticed by reference to said Fig. 1 that while the device P rests upon the ribs $j'$ its side arms $p'$ are held between the side guards $j$ as before stated. The ends of the side arms $p'$ are connected by chain or other flexible connection $p^4$ with a bar R formed with central eye $r$, and such bar when the parts are held as shown in Fig. 1 is seated in keepers S S on the rear end of the platform J.

In operation after a sufficient amount of stalks have been gathered on the platform and the shock is completed the rod O is withdrawn (the arm $l'$ serving to hold the upper end of the shock in place) and after the frame and platform have been dropped to their lowest position and the platform tilted, such rod is driven through the eye $r$ of the rod R into the ground and such rod R is lifted out of its keepers. The machine is then again started forward and as the bail P is thus held anchored and as it engages the shock in the manner clearly understood as seen in Fig. 3, it is manifest that the platform will pull from under the shock and such shock will remain standing in substantially its original shape on the ground. After it has been thus moved onto the ground the device P is removed from the shock by disconnecting one of the chain ends from one end of the bar R and it is again placed on the platform such platform again turned down, the frame elevated and the rod O reinserted in the aperture $l^3$ in the arm $l$ and the operation of cutting and collecting the stalks is repeated as before.

In the practical construction of my machine I also employ means for moving the guards H automatically outward over the cutter as the machine is pulled sidewise, and such means consist preferably of the flexible connections T T' which are joined at one end to the link arms $t\,t'$, pass over guides on the front cross beam $a^2$ and are connected to the yoke frame $c^2$ as at $a^5$. (See Fig. 1.) By thus connecting the guards with the yoke or caster supporting frame it will be readily seen that when the caster wheel is turned in the direction indicated by the arrow the guard H on the side to which the machine is to be turned will be pulled out (by the connection T) to cover the cutter at such side.

While I have not illustrated it, it is manifest that the connections between such guards and the caster frame $c^2$ may be readily modified to cause the guards to be moved outward in unison or both outward and inward as the said yoke frame is turned.

Having thus described my invention, what I claim, and desire to secure by Letters Patent, is—

1. A corn harvester comprising a main or cutter frame having a vertically adjustable caster wheel support at its front end, an axle fixedly held on its rear end, said axle having crank portions formed with stub axles, the supporting wheels journaled on such stub axles, a lever arm fixedly connected with one of the crank members, provided with a lock pawl, a rack on the main frame, a rearwardly extending tilting platform hinged at its front end to the rear end of the main frame, and means for locking the tilting frame to its horizontal position, all arranged substantially in the manner and for the purposes described.

2. In a corn harvester, a tilting shocker platform, having an arm projected over the rear end thereof, said arm fixedly held on such platform to tilt therewith substantially as shown and described.

3. In a corn harvesting machine essentially as described, a tilting shocker platform, having a central vertical member secured at its rear end, said member having a rearwardly extending horizontal apertured member adapted to serve as a support for the shock as the platform is tilted and the shock discharged, and to receive a detachable transverse arm as the shock is being formed all substantially as shown and for the purposes described.

4. In a corn harvester, the combination with the main or cutter frame, of a tilting shock forming platform hinged to the rear end of the main frame and projected rearward therefrom, said tilting platform having a series of longitudinal ways for guiding and supporting the lower end of the stalks as they are slid off the platform, and a vertical member projected up from the front end of the platform, formed with a rearwardly extending arm disposed in a parallel plane with the guide ways on the platform, all arranged substantially as shown whereby the upper and lower guides for the shock retain their proper parallel position when the platform is tilted, as and for the purpose set forth.

5. In a corn-harvester, the combination with a supporting frame, and knives carried thereby and having cutting edges arranged diagonally to the draft, guards adapted to be moved to project beyond the edges of said blades to protect said cutting edges, draft devices, and devices operated by the lateral movement of said draft devices for operating said guards, substantially as described.

6. In a corn-harvester of the class described, the combination with a tilting platform having a series of ribs $g'$, and side guards $j$ extended above said ribs, of the sling hold on said ribs formed of a bail-like portion P having spring arms $p$ adapted to seat against the guards $j$, the pull bar R, and flexible connections between said bar R and bail P, all substantially as and for the purpose described.

7. In a corn harvester substantially as described the combination of the swinging platform, the arm L having a rearwardly extending apertured member $l$, the sling P having a draft bar R formed with a central eye $r$ and the anchor rod O adapted to be detachably fitted to the apertured arm $l$ and to form an anchor rod fitting through the eye $r$ of the bar R, all substantially as and for the purpose described.

8. In a corn harvester substantially as described, the combination with the main frame, the knives F, of the swinging guard H mounted on the main frame and having undercut portions $h$ and shoulders $h'$ adapted to fit over the knives when the guards swing outward, substantially as and for the purpose described.

9. In a corn harvester essentially as described, the combination with the frame, the knives and a caster wheel support at the front end, of swinging guards or shields mounted on such frame to be swung over the cutting edges of the knives, and connections between such guards and the caster frame whereby such guards are moved outward as the caster frame is turned sidewise, substantially as and for the purpose described.

10. In a corn-harvester, the combination with the frame and the knives or cutters, of swinging guards or shields mounted on such frame to be swung over the cutting edges of the knives, and connections between the guards and the draft mechanism whereby such guards are automatically moved outward as the machine is turned sidewise, substantially as and for the purpose described.

GEORGE H. SCHANCK.

Witnesses:
FRED G. DIETERICH,
SOLON C. KEMON.